US012737739B2

(12) United States Patent
Abraham

(10) Patent No.: US 12,737,739 B2
(45) Date of Patent: Sep. 15, 2026

(54) CONTEXT-AWARE PAYMENTS USING INDOOR POSITIONING SYSTEMS

(71) Applicant: International Business Machines Corporation, Armonk, NY (US)

(72) Inventor: Subil Mathew Abraham, Lewisville, TX (US)

(73) Assignee: International Business Machines Corporation, Armonk, NY (US)

( * ) Notice: Subject to any disclaimer, the term of this patent is extended or adjusted under 35 U.S.C. 154(b) by 36 days.

(21) Appl. No.: 18/404,955

(22) Filed: Jan. 5, 2024

(65) Prior Publication Data

US 2025/0225492 A1 Jul. 10, 2025

(51) Int. Cl.
*G06Q 20/12* (2012.01)
*G06Q 20/40* (2012.01)

(52) U.S. Cl.
CPC ............. *G06Q 20/12* (2013.01); *G06Q 20/40* (2013.01)

(58) Field of Classification Search
CPC ...................................................... G06Q 20/40
See application file for complete search history.

(56) References Cited

U.S. PATENT DOCUMENTS 9,230,134 B1 * 1/2016 Girgera ..................... G06F 7/04
10,611,570 B1 * 4/2020 Washington ........... B65G 1/137
10,726,401 B2 * 7/2020 Hertel .................... G06Q 20/10
11,196,985 B1 * 12/2021 Elmieh ................ H04N 13/302
11,373,185 B2 6/2022 Li
2009/0006254 A1 1/2009 Mumm
2013/0144732 A1 6/2013 Rothschild
2014/0114800 A1 4/2014 Levitt
2018/0075063 A1 * 3/2018 Patel ................. G06F 17/30241
2018/0121913 A1 * 5/2018 Unnerstall ............. G06Q 20/40

(Continued)

FOREIGN PATENT DOCUMENTS

CA 3207828 * 7/2023 ......... G06Q 30/0601
DE 3806020 * 4/2021 ......... G06Q 30/0639

(Continued)

OTHER PUBLICATIONS

Bregman, et al., in "Can't touch this: the impact of augmented reality versus touch and non-touch interfaces on perceived ownership," from Virtual Reality, 23, 269-280, 2019 (Year: 2019).*

(Continued)

*Primary Examiner* — Mike Anderson
*Assistant Examiner* — Brandon M Duck
(74) *Attorney, Agent, or Firm* — Michael O'Keefe

(57) ABSTRACT

According to one embodiment, a method, computer system, and computer program product for context-aware payments is provided. The embodiment may include generating a set of permissions for a user. The embodiment may also include assigning the generated set of permissions to a payment account. The embodiment may further include receiving an authorization request from the payment account to engage in a commerce-based transaction. The embodiment may also include determining whether to authorize the commerce-based transaction based, at least in part, on comparing contextual information associated with the commerce-based transaction to the generated set of permissions assigned to the particular payment account.

11 Claims, 2 Drawing Sheets

(56) References Cited

U.S. PATENT DOCUMENTS

| | | | | |
|---|---|---|---|---|
| 2019/0164098 | A1* | 5/2019 | Setchell | G06Q 10/06 |
| 2019/0205851 | A1* | 7/2019 | Sinha | G06Q 20/12 |
| 2020/0015034 | A1* | 1/2020 | Ahn | H04W 4/021 |
| 2020/0388099 | A1* | 12/2020 | Ji | G07F 9/002 |
| 2021/0027608 | A1* | 1/2021 | Shakedd | G08B 21/24 |
| 2022/0207595 | A1* | 6/2022 | Andronic | G06Q 30/06 |
| 2022/0351280 | A1* | 11/2022 | Cardenas Gasca | G06Q 30/06 |
| 2023/0047509 | A1 | 2/2023 | Dhodapkar | |
| 2023/0291740 | A1* | 9/2023 | Ashby | H04L 63/102 |
| 2024/0037593 | A1* | 2/2024 | Navon | G06Q 30/02 |
| 2024/0349888 | A1* | 10/2024 | Liu | A47B 57/58 |

FOREIGN PATENT DOCUMENTS

| | | | |
|---|---|---|---|
| JP | WO 2023112367 | * 6/2023 | G05D 1/02 |
| JP | WO 2023152818 | * 8/2023 | G08G 1/0969 |
| JP | 2023151723 | * 10/2023 | G05D 1/02 |
| WO | WO2024254099 | * 12/2024 | G06Q 20/02 |

OTHER PUBLICATIONS

Disclosed Anonymously, "System & Method to Control Purchase Restrictions Gaming Environments/Platforms", An IP.com Prior Art Database Technical Disclosure, IP.com No. IPCOM000261050D, IP.com Electronic Publication Date: Jan. 22, 2020, 6 pages.

* cited by examiner

CONTEXT-AWARE PAYMENTS USING INDOOR POSITIONING SYSTEMS

BACKGROUND

The present invention relates generally to the field of computing, and more particularly to payment systems.

Payment systems are integral components of the financial infrastructure that facilitate the transfer of monetary value between parties. They encompass a wide range of mechanisms and platforms, including cash, checks, credit cards, debit cards, bank transfers, and digital wallets. These systems enable transactions for goods and services, remittances, and financial instruments among consumers, businesses, financial institutions, and government entities.

In the digital age, payment systems have evolved significantly. Traditional methods like cash and checks are being supplemented or even replaced by digital payment systems. These include online banking, mobile payment apps, and cryptocurrencies. Digital payment systems offer advantages such as speed, convenience, and the ability to handle complex transactions. They play a crucial role in e-commerce and the broader digital economy.

SUMMARY

According to one embodiment, a method, computer system, and computer program product for context-aware payments is provided. The embodiment may include generating a set of permissions for a user. The embodiment may also include assigning the generated set of permissions to a payment account. The embodiment may further include receiving an authorization request from the payment account to engage in a commerce-based transaction. The embodiment may also include determining whether to authorize the commerce-based transaction based, at least in part, on comparing contextual information associated with the commerce-based transaction to the generated set of permissions assigned to the particular payment account.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
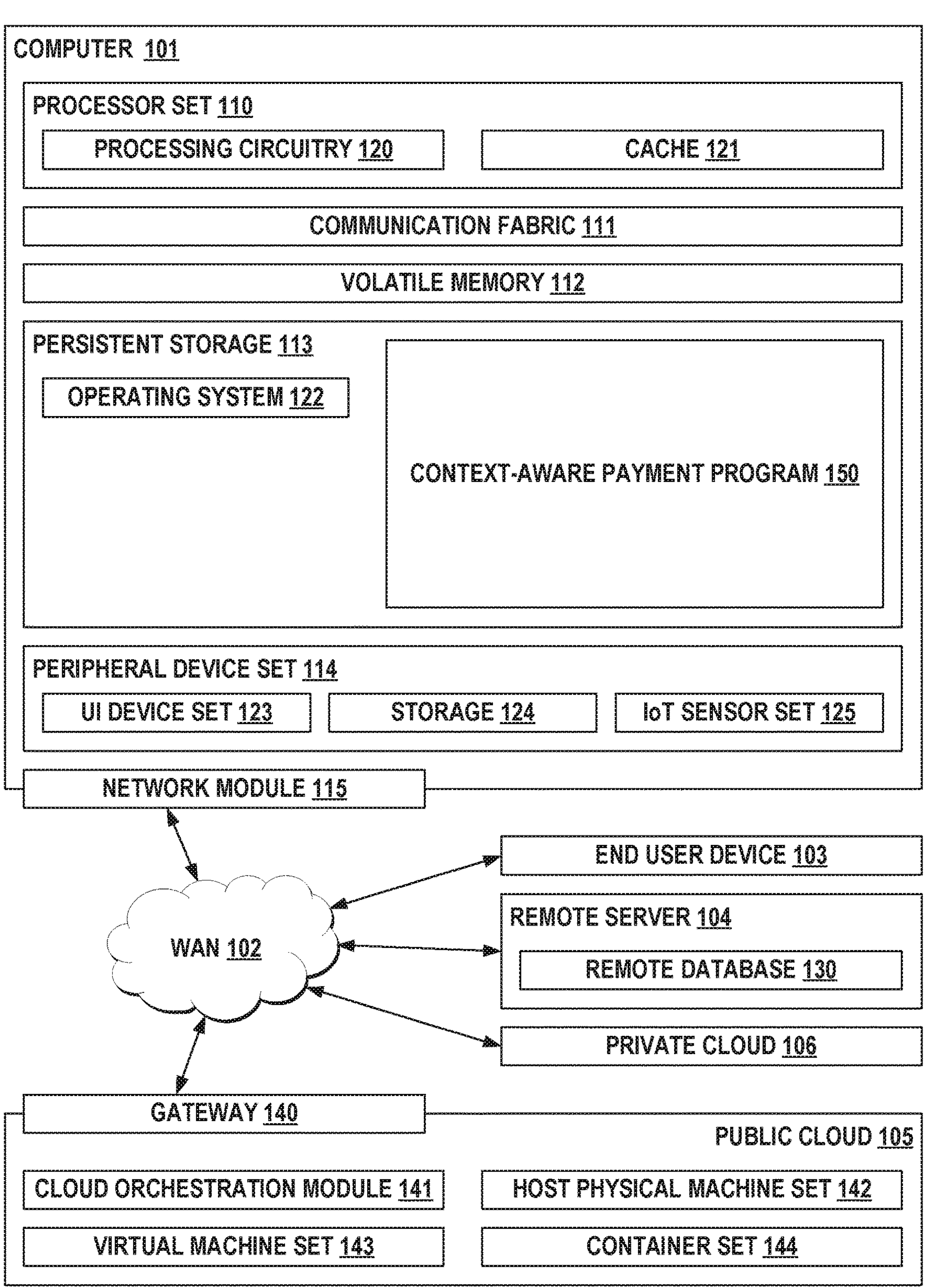
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

It is to be understood that the singular forms “a,” “an,” and “the” include plural referents unless the context clearly dictates otherwise. Thus, for example, reference to “a component surface” includes reference to one or more of such surfaces unless the context clearly dictates otherwise.

Embodiments of the present invention relate to the field of computing, and more particularly to payment systems. The following described exemplary embodiments provide a system, method, and program product to, among other things, enable a dynamic, context-aware payment system that allows an administrator to designate various restrictions or authorizations surrounding use of a payment card. Therefore, the present embodiment has the capacity to improve the technical field of payment systems by enabling issuer-specified restrictions or authorizations of varying granularities on a payment card in various categories, such as, but not limited to, geographic location, retailer, department, or product category.

As previously described, payment systems are integral components of the financial infrastructure that facilitate the transfer of monetary value between parties. They encompass a wide range of mechanisms and platforms, including cash, checks, credit cards, debit cards, bank transfers, and digital wallets. These systems enable transactions for goods and services, remittances, and financial instruments among consumers, businesses, financial institutions, and government entities.

In the digital age, payment systems have evolved significantly. Traditional methods like cash and checks are being supplemented or even replaced by digital payment systems. These include online banking, mobile payment apps, and cryptocurrencies. Digital payment systems offer advantages such as speed, convenience, and the ability to handle complex transactions. They play a crucial role in e-commerce and the broader digital economy.

Businesses and banks frequently focus on making transactions easier and more convenient for consumers by taking friction out of the payment process. Friction relates to a process, step, or event that slows down, complicates, or interrupts the flow of the transaction. In relation to payment systems, friction might be experienced when a user is required to create an account with an organization before making an online purchase. Throughout the previous century, technologies have been developed to reduce friction and improve the smoothness of transactions, such as, but not limited to, credit cards, gift cards, contactless mobile wallets etc.

However, there is still a great need for new forms of payment which are transient in nature and can be conveniently used, such as during a shopping session inside an enclosed shopping space by a group of individuals that allows for specific use restrictions. As such, it may be advantageous to, among other things, develop a dynamic payment system that utilizes context and location sensitivity when considering which purchases are authorized by an issuer or administrator.

According to at least one embodiment, a context-aware payment program may implement a payment card with set of permissions affecting the use of the payment card. The set of permissions may relate to a geographic location, a retailer, a retailer type, a product category, or a specific product. The context-aware payment program may then monitor purchases made with the payment card to determine if the purchase location, purchase retailer, and/or products being purchased satisfy the set of permissions. If the context-aware payment program determines the purchase location, purchase retailer, and/or products being purchased do not satisfy the set of permissions, the context-aware payment program may decline the transaction and provide a reason for declining. If the context-aware payment program determines the purchase location, purchase retailer, and/or products being purchased do satisfy the set of permission, the context-aware payment program may authorize the transaction.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Referring now to FIG. 1, computing environment 100 contains an example of an environment for the execution of at least some of the computer code involved in performing the inventive methods, such as context-aware payment program 150. In addition to context-aware payment program 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and context-aware payment program 150, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer, or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, for illustrative brevity. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in context-aware payment program 150 in persistent storage 113.

Communication fabric 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel. The code included in context-aware payment program 150 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN 102 and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community, or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

According to at least one embodiment, the context-aware payment program 150 may generate a set of permissions for a user engaging in a transaction and assign the set of permissions to a payment account. When the user presents a payment card associated with the payment account as tender for a transaction, the context-aware payment program 150 may receive an authorization request from the payment account to engage in the transaction. The context-aware payment program 150 may then determine whether the transaction satisfies the set of permissions and, if so, validate the authorization request. However, if the context-aware payment program 150 determines the transaction does not satisfy the set of permissions, the context-aware payment program 150 may deny the authorization request. In one or more embodiments, the context-aware payment program 150 may allow for the use of an augmented reality (AR) system for use with a user device, such as EUD 103, capable of depicting retailers, departments, or any other scale of granularity within a retailer as approved for purchase or restricted for purchase based on the set of permissions using a virtual super-imposed animation of a virtual fence. In one or more embodiments, the context-aware payment program 150 may allow for implementation in a physical, brick-and-mortar storefront but, in the same or other embodiments, the context-aware payment program 150 may also allow for implementation in a virtual storefront, such as a website or online retailer.

In one or more embodiments, the context-aware payment program 150 may integrate with various Internet of Things (IoT) devices to create an infrastructure managing observations of items subject to purchase by a user utilizing a payment card with a set of permissions. For the context-aware payment program 150 to contextualize the dynamic and transient nature of retail inventories, the context-aware payment program 150 may require a communicative connection to a baseline infrastructure of core services, such as, but not limited to, a stock management system, a planogram, a payment gateway, etc. A stock management system may include a smart shelf space system designed to improve item category performance with which the context-aware payment program 150 may connect and integrate. A planogram, or POG, may be a schematic for planning the layout of a retail space with attention to product placement. POGs may ensure efficiency in the final flow of stock to shelves, from shelves to shopping baskets, and allow for quick identification of products. Similarly, integration with payment gateways may allow the context-aware payment program 150 to place a stopgap between a check against the set of permissions and the transfer of funds from a user payment account to a retailer account.

As previously described, the context-aware payment program 150 may utilize IoT devices deployed throughout an environment, such as a mall or retail establishment. The context-aware payment program 150 may aid in the identification of retail establishments throughout a premises and map product and category placements throughout a floorplan. Currently, many retail establishments utilize IoT-based sensors in their infrastructure for such technologies as smart shelves, digital signage, and geo-targeted SMS campaigns.

The context-aware payment program 150 may also integrate with a building management system. Depending on the infrastructure encountered by the user, various building orientations and layouts may be encountered, such as, but not limited to, an indoor mall, an outdoor mall, an outlet mall, or a standalone retailer. Some layouts utilize a building management system as part of the IoT that can be utilized to account for spaces leased by different merchants/retailers inside the layout space. Some systems, such as IBM TRIRIGA® (TRIRIGA and all TRIRIGA-based trademarks and logos are trademarks or registered trademarks of International Business Machines Corporation and/or its affiliates), may be integrated with a set of sensor-based technologies capable of transforming retail environments into interactive experiences. The context-aware payment program 150 may utilize client devices, such as EUD 103, to surface insights from the building management system so that a payment gateway can identify if a user is within an indoor virtual boundary or inside a specific merchant store to authorize payment according to the set of permissions. In at least one embodiment, building or facility managers can also monitor and analyze the frequency of transactions to identify fraudulent activities taking place on premises.

The context-aware payment program 150 may further utilize an indoor positioning system, a global positioning system, and/or navigation technologies to gain knowledge and awareness of virtual boundaries in a retailer or retail space. Such technologies may enable seamless interaction with virtual transactions and also allow payment gateway providers to authenticate that the transaction occurred within a geo-fenced area that was determined by the authorizing user or any user that established the set of permissions. Similarly, the context-aware payment program 150 may utilize the user's historical footpath throughout an establishment to determine if the products selected by the user are available for purchase based on the set of permissions. In one or more embodiments, the context-aware payment program 150 may issue notifications to the user through a client device, such as EUD 103 or computer 101, to inform the user if they are able to purchase products based the category, section, aisle, brand, and/or merchant near the user's location based on the specific location-determining technology being utilized (e.g., an indoor positioning system, a global positioning system, etc.). Similarly, the context-aware payment program 150 may transmit a notification to an authorizing user when a transaction occurs and receive a report with information relating to the items purchased in the transaction using the payment card. For example, a parent may issue their child a payment card for use in purchasing snacks from a store. When the child purchases items from the approved retailer, the parent may receive a report of the items purchased. The context-aware payment program 150 may obtain information about the purchased items from a retailer repository, such as remote database 130, or through metadata obtained when processing the transaction between the retailer and a financial institution, such as a universal product code (UPC) or other identifying information.

Additionally, prior to initially performing any actions, the context-aware payment program 150 may perform an opt-in procedure. The opt-in procedure may include a notification of the data the context-aware payment program 150 may capture and the purpose for which that data may be utilized by the context-aware payment program 150 during data gathering and operation. Furthermore, notwithstanding depiction in computer 101, the context-aware payment program 150 may be stored in and/or executed by, individually or in any combination, end user device 103, remote server 104, public cloud 105, and private cloud 106. The context-aware payment method is explained in more detail below with respect to FIG. 2.

Figure 2:
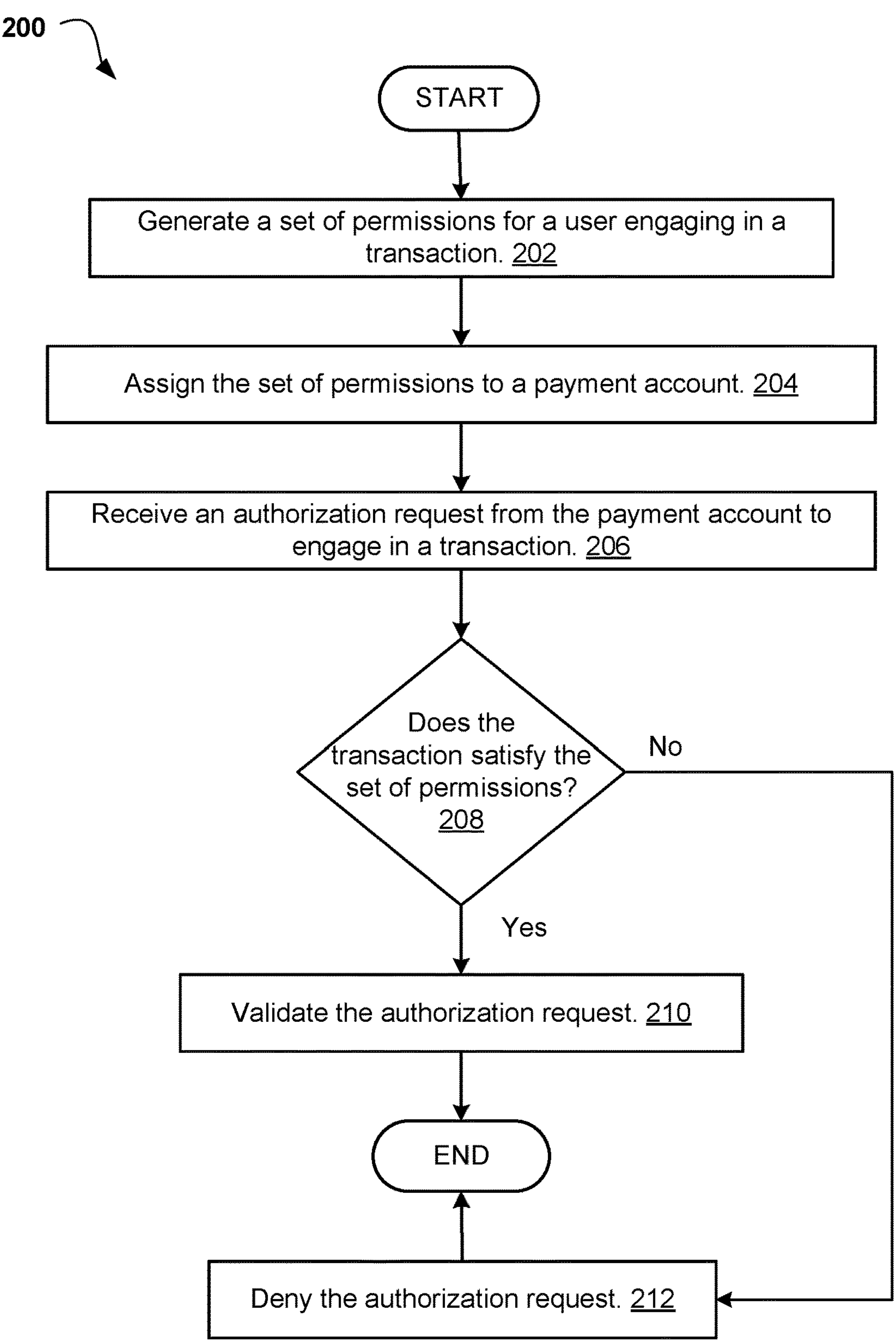
FIG. 2 illustrates an operational flowchart for a context-aware payment process according to at least one embodiment.

Referring now to FIG. 2, an operational flowchart for a context-aware payment process 200 according to at least one embodiment. At 202, the context-aware payment program 150 generates a set of permissions for a user engaging in a transaction. When establishing a context-aware payment, the context-aware payment program 150 may require user to establish a set of permissions surrounding the use of the payment card in a real-world environment. The user may relate to an administrator, issuer, or any individual that has control over a sum of monies, credits, legal tender, cryptocurrency, or any other form of value capable of being assigned to a payment card, whether physical or virtual. Furthermore, the permissions being established may include any restrictions desired by the user toward spending the value on the payment card. The permissions may include, but are not limited to, geographic location(s), retailer(s), manufacturer(s), time of day, a period of time, category of item(s), or type of item(s). For example, a parent may establish permissions for expenditure of a payment card issued to a child that the child may only spend the value of the payment card in a toy aisle of a specific retailer or only on a specific type of toy, such as a board game.

In one or more embodiments, the user may interact with a graphical user interface of a user device, such as EUD 103, to identify which permissions the context-aware payment program 150 is to establish on the payment card. The context-aware payment program 150 may then store the permissions in an applicable repository, such as storage 124 or remote database 130 for later comparison and analysis when an individual in possession of the payment card wishes to make a transaction.

Then, at 204, the context-aware payment program 150 assigns the set of permissions to a payment account. One the set or permissions have been established, the context-aware payment program 150 may assign the set of permissions to the payment account associated with the payment card issued or given to the individual to which the set of permissions apply. The context-aware payment program 150 may store the set of permissions in a central repository, such as remote database 130, or directly to the payment card. In one or more embodiments, if the payment card is a digital wallet, the context-aware payment program 150 may assign the set of permissions as metadata associated with the account or user profile associated with the digital wallet.

Next, at 206, the context-aware payment program 150 receives an authorization request from the payment account to engage in a transaction. When an individual uses a payment card, the context-aware payment program 150 may receive an authorization request for a transaction in which the payment account or payment card is being used. When such a request is received, the context-aware payment program 150 may also receive information associated with the geographic location of the transaction, a retailer at which the transaction is being conducted, and metadata for one or more items that are being purchased in the transaction. The metadata for the one or more items may include, but are not limited to, type, category, name, department location, and price. For example, continuing the previous scenario, if a child is attempting to purchase items from a store at which a parent has given them a payment card with a set of permissions associated with it, the context-aware payment program 150 may receive metadata associated with each item sufficient for the context-aware payment program 150 to identify each item attempting to be purchased by the child to ensure the items satisfy the set of permissions before authorizing the transaction.

In one or more embodiments, when an authorization request is received, the context-aware payment program 150 may capture various data items related to the set of permissions in order to subsequently determine whether the set of permissions are satisfied. For example, when an authorization request is received, the context-aware payment program 150 may capture a geographic location of the user through a device's global positioning system (GPS) or an indoor positioning system and metadata (e.g., type, category, price, intended age usage, etc.) of items subject to purchase in the transaction based on a retailer product database.

Then, at 208, the context-aware payment program 150 determines whether the transaction satisfies the set of permissions. Upon the receipt of the authorization request, the context-aware payment program 150 may compare characteristics of the transaction to the set of permissions to determine whether the context-aware payment program 150 should authorize the transaction. Depending on a storage location of the set of permissions, the context-aware payment program 150 may access the set of permissions in different locations. For example, if the context-aware payment program 150 stores the set of permissions on a centralized server, such as remote server 104 or private cloud 106, the context-aware payment program 150 may transmit a request to the centralized server to make the authorization determination. Similarly, if the context-aware payment program 150 stores the set of permissions locally on a storage unit of a payment card, the context-aware payment program 150 may retrieve the set of permissions from that storage location and process the determination on a point-of-sale computing device or an end user device, such as EUD 103, depending on whether the context-aware payment program 150 is installed on or capable of utilizing the processing power of such devices. In other embodiments, the context-aware payment program 150 may transmit the request for processing on a centralized remote server, such as remote server 103, regardless of the storage location of the set of permissions.

In one or more embodiments, the authorization to proceed with the transaction based on the set of permissions by the context-aware payment program 150 may be separate and distinct from financial institution authorization to transfer funds based on a financial institution's authorization rules (e.g., sufficient funds to process the transaction). However, in one or more embodiments, a financial institution may utilize the context-aware payment program 150 and, therefore, an authorization based on a determination that the set of permissions are satisfied may be equivalent or the same as the authorization for fund transfer by a financial institution. For example, if a financial institution is utilizing the context-aware payment program 150, a single authorization determination may be made when the context-aware payment program 150 determines the set of permissions are satisfied and other financial institution systems determine account criteria (e.g., balance values) are also satisfied and the transaction should be authorized to process.

If the context-aware payment program 150 determines the transaction satisfies the set of permissions (step 208, "Yes" branch), then the context-aware payment process 200 may proceed to step 210 to validate the authorization request. If the context-aware payment program 150 determines the transaction does not satisfy the set of permissions (step 208, "No" branch), then the context-aware payment process 200 may proceed to step 212 to deny the authorization request.

Next, at 210, the context-aware payment program 150 validates the authorization request. If the context-aware payment program 150 determine each of the permissions within the set of permissions is satisfied, the context-aware payment program 150 may authorize the transaction and allow the transfer of funds in an account associated with the payment card to an account associated with the retailer. For example, in the previous scenario where a child is attempting to use a payment card with a set of permissions, the context-aware payment program 150 may authorize the transaction if the child is attempting to purchase an item at a store from which the child's parent has authorized the purchasing of items.

Then, at 212, the context-aware payment program 150 denies the authorization request. Conversely to step 210, if the context-aware payment program 150 determines a permission within the set of permissions is not satisfied, the context-aware payment program 150 may deny the transaction and prevent funds from being transferred from the account associated with the payment card to an account associated with the retailer. In such a situation, the context-aware payment program 150 may generate a notification and display that notification on a device display screen used for conducting the transaction either to the user or to an individual associated with the retailer. The notification may present information detailing the reason(s) for the denial of the transaction. For example, in the previously described scenario, if a child is attempting to purchase an item from a retailer not listed or authorized within the set of permissions associated with the payment card by the child's parent, then the context-aware payment program 150 may display a detailed notification to the child on a display screen at a retailer checkout stating "transactions at this retailer are not approved", "payment card permissions prevent this transaction", or similar language conveying a reason for denial of the transaction.

It may be appreciated that FIG. 2 provides only an illustration of one implementation and does not imply any limitations with regard to how different embodiments may be implemented. Many modifications to the depicted environments may be made based on design and implementation requirements. In one or more embodiments, the context-aware payment program 150 may be implemented with IoT and AR devices, such as a mobile phone display screen or an augmented reality headset, to provide a visual boundary of authorized items, aisles, departments, and/or retailers based on the set of permissions on a payment card. For example, while using an AR device, the context-aware payment program 150 may present to a user a virtual super-imposed animation of a virtual fence around the item(s), aisle(s), department(s), and/or retailer(s) based on the set of permissions. The color in which the animation is depicted may be based on whether the user is authorized to purchase items from the respective areas. For example, the context-aware payment program 150 may present areas in which a user is authorized to purchase items in a green color with a preconfigured transparency but areas in which a user is not authorized to purchase items in a red color with a similar, or the same, preconfigured transparency. Similarly, if the set of permissions only authorizes purchases in a specific time period, the context-aware payment program 150 may present the color of the virtual boundaries based on the specific time period permissions. For example, if an administrator authorizes purchases only between 9:00 A.M. and 3:00 P.M. from a specific retailer, the context-aware payment program 150 may display, on a display of an augmented reality device, red boundaries around, within, or about the retailer space at 3:30 P.M. but green boundaries around, within, or about the retailer at 1:30 P.M.

In one or more alternate embodiments, the context-aware payment program 150 may only activate the payment account when the user is within a preconfigured geofence associated with locations at which the user is authorized to purchase items. For example, if an administrator or issuer of the payment card, or account, establishes the set of permissions to only allow purchases as a specific retailer, the context-aware payment program 150 may establish a geofence at the interior perimeter of locations of the retailer. Therefore, when the user enters the geofence (i.e., enters the retail location), the context-aware payment program 150 may activate the payment card associated with the account. Conversely, if the user is not within the geofence, the context-aware payment program 150 may deactivate the payment card or account to prevent purchases from being made on the payment card or account. For example, continuing the previous example, if the user leaves the retailer and thus leaves the geofence, the context-aware payment program 150 may deactivate the payment card or account.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:

generating a set of permissions for a user as metadata associated with a user profile, wherein the set comprises time-based permissions, wherein the generated set of permissions further comprises contextual and location-based permissions for utilization of a payment account;

assigning the generated set of permissions to the payment account; and displaying, via an augmented reality (AR)-based user-interface, a virtual boundary associated with one or more real-world locations for which the user is authorized to use the payment account to purchase a tangible item, wherein the virtual boundary is a super-imposed animation of a virtual fence around the one or more real-world locations, and wherein a location of the virtual boundary is determined using an indoor positioning system, and wherein the virtual boundary is displayed in a first color for items authorized under the set of permissions and in a second color for items denied under the set of permissions.

2. The method of claim 1, further comprising:

in response to the user being within a preconfigured geo-fence, activating the payment account; and in response to the user being outside the preconfigured geo-fence, deactivating the payment account.

3. The method of claim 1, wherein the virtual boundary is displayed in a green color when the one or more locations are associated with locations or items for which the user is authorized to purchase based on the set of permissions, and wherein the virtual boundary is displayed in a red color when the one or more locations are associated with locations or items for which the user is not authorized to purchase based on the set of permissions.

4. The method of claim 1, wherein the set of permissions are further selected from a group consisting of one or more geographic locations, one or more retailers, one or more manufacturers, a time of day, a period of time, one or more categories of items, or one or more types of items.

5. A computer system comprising:

a processor set;

one or more computer-readable storage media; and program instructions stored on the one or more computer-readable storage media to cause the processor set to perform operations comprising:

generating a set of permissions for a user as metadata associated with a user profile, wherein the set comprises time-based permissions, wherein the generated set of permissions further comprises contextual and location-based permissions for utilization of a payment account;

assigning the generated set of permissions to the payment account; and displaying, via an augmented reality (AR)-based user-interface, a virtual boundary associated with one or more real-world locations for which the user is authorized to use the payment account to purchase a tangible item, wherein the virtual boundary is a super-imposed animation of a virtual fence around the one or more real-world locations, and wherein a location of the virtual boundary is determined using an indoor positioning system, and wherein the virtual boundary is displayed in a first color for items authorized under the set of permissions and in a second color for items denied under the set of permissions.

6. The computer system of claim 5, further comprising:

in response to the user being within a preconfigured geo-fence, activating the payment account; and in response to the user being outside the preconfigured geo-fence, deactivating the payment account.

7. The computer system of claim 5, wherein the virtual boundary is displayed in a green color when the one or more locations are associated with locations or items for which the user is authorized to purchase based on the set of permissions, and wherein the virtual boundary is displayed in a red color when the one or more locations are associated with locations or items for which the user is not authorized to purchase based on the set of permissions.

8. The computer system of claim 5, wherein the set of permissions are further selected from a group consisting of one or more geographic locations, one or more retailers, one or more manufacturers, a time of day, a period of time, one or more categories of items, or one or more types of items.

9. A computer program product comprising:

one or more computer-readable storage media; and program instructions stored on the one or more computer-readable storage media to perform operations comprising:

generating a set of permissions for a user as metadata associated with a user profile, wherein the set comprises time-based permissions, wherein the generated set of permissions further comprises contextual and location-based permissions for utilization of a payment account;

assigning the generated set of permissions to the payment account; and displaying, via an augmented reality (AR)-based user-interface, a virtual boundary associated with one or more real-world locations for which the user is authorized to use the payment account to purchase a tangible item, wherein the virtual boundary is a super-imposed animation of a virtual fence around the one or more real-world locations, and wherein a location of the virtual boundary is determined using an indoor positioning system, and wherein the virtual boundary is displayed in a first color for items authorized under the set of permissions and in a second color for items denied under the set of permissions.

10. The computer program product of claim 9, further comprising:

in response to the user being within a preconfigured geo-fence, activating the payment account; and in response to the user being outside the preconfigured geo-fence, deactivating the payment account.

11. The computer program product of claim 9, wherein the virtual boundary is displayed in a green color when the one or more locations are associated with locations or items for which the user is authorized to purchase based on the set of permissions, and wherein the virtual boundary is displayed in a red color when the one or more locations are associated with locations or items for which the user is not authorized to purchase based on the set of permissions.

* * * * *